US007691951B2

(12) United States Patent
Ohrbom et al.

(10) Patent No.: US 7,691,951 B2
(45) Date of Patent: *Apr. 6, 2010

(54) METHOD FOR OBTAINING COATING COMPOSITIONS HAVING REDUCED VOC

(75) Inventors: Walter H. Ohrbom, Hartland Township, MI (US); Marvin L. Green, Brighton, MI (US); Gregory G. Menovcik, Farmington, MI (US)

(73) Assignee: BASF Corporation, Mount Olive, NJ (US)

( * ) Notice: Subject to any disclaimer, the term of this patent is extended or adjusted under 35 U.S.C. 154(b) by 71 days.

This patent is subject to a terminal disclaimer.

(21) Appl. No.: 11/868,104

(22) Filed: Oct. 5, 2007

(65) Prior Publication Data

US 2008/0027183 A1 Jan. 31, 2008

Related U.S. Application Data

(60) Division of application No. 10/866,596, filed on Jun. 11, 2004, now Pat. No. 7,321,013, which is a continuation-in-part of application No. 10/351,079, filed on Jan. 23, 2003, now Pat. No. 6,962,730, which is a division of application No. 09/741,511, filed on Dec. 19, 2000, now Pat. No. 6,541,594.

(51) Int. Cl.
*C08L 67/00* (2006.01)
*C08G 18/00* (2006.01)
(52) U.S. Cl. .................. 525/418; 524/714; 524/136; 526/317.1; 526/320; 526/328; 528/45
(58) Field of Classification Search ................. 525/418; 528/45; 524/714, 736; 526/317.1, 320, 338
See application file for complete search history.

(56) References Cited

U.S. PATENT DOCUMENTS

| 4,003,868 | A |   | 1/1977 | Smith et al. |
|---|---|---|---|---|
| 4,118,427 | A |   | 10/1978 | Rhein et al. |
| 4,118,437 | A |   | 10/1978 | Parekh |
| 4,126,527 | A |   | 11/1978 | Kaufman |
| 4,246,376 | A |   | 1/1981 | Didomenico, Jr. |
| 4,343,728 | A |   | 8/1982 | Eschwey et al. |
| 4,546,120 | A |   | 10/1985 | Peerman et al. |
| 5,106,651 | A |   | 4/1992 | Tyger et al. |
| 5,236,987 | A |   | 8/1993 | Arendt |
| 5,334,650 | A |   | 8/1994 | Serdiuk et al. |
| 5,587,428 | A |   | 12/1996 | Jones et al. |
| 5,688,867 | A |   | 11/1997 | Scheibelhoffer et al. |
| 5,783,272 | A |   | 7/1998 | Wong |
| 6,228,953 | B1 | * | 5/2001 | Barancyk et al. ............. 525/374 |
| 6,541,594 | B2 | * | 4/2003 | Ohrbom et al. ................ 528/45 |
| 6,878,841 | B2 | * | 4/2005 | Rink et al. ..................... 560/24 |
| 7,037,583 | B2 | * | 5/2006 | Furman et al. ............... 428/403 |
| 2002/0119253 | A1 |   | 8/2002 | Ohrbom et al. |
| 2004/0087747 | A1 |   | 5/2004 | Ohrbom et al. |

FOREIGN PATENT DOCUMENTS

| EP | 0026984 A1 | 4/1981 |
|---|---|---|
| EP | 0339262 A2 | 11/1989 |
| WO | WO95/19997 A1 | 7/1995 |
| WO | WO96/23034 A1 | 8/1996 |
| WO | WO96/23035 A1 | 8/1996 |
| WO | WO99/35189 A2 | 7/1999 |
| WO | WO01/56978 A1 | 8/2001 |
| WO | WO 0156978 A1 * | 8/2001 |
| WO | WO02/50203 A2 | 6/2002 |
| WO | WO03/076530 A2 | 9/2003 |

OTHER PUBLICATIONS

International Preliminary Report on Patentability for PCT/US2005/020611 dated Dec. 14, 2006.
International Search Report for PCT/US2005/020611 dated Dec. 29, 2005.
P.H. Lamers, et al.; PPG Industries, Inc., Allison Park, PA; Ultraviolet irradiation of melamine containing clearcoats for improved acid etch resistance; Elsevier Science Limited; Polymer Degradation and Stability 55 (1997) pp. 309-322.
Frank N. Jones, et al.; Recent studies of self-condensation and co-condensation of melamine-formaldehyde resins; cure at low temperatures; Elsevier Science S.A.; Progress in Organic Coatings 24 (1994) pp. 189-208.
Robson F. Storey, et al.; Proceedings of the Seventeenth Water-Borne and Higher-Solids Coatings Symposium; The Department of Southern Mississippi & The Southern Society for Coatings Technology held in New Orleans, LA Feb. 21-23, 1990; pp. 447-471.

(Continued)

*Primary Examiner*—David Wu
*Assistant Examiner*—Michael M Bernshteyn
(74) *Attorney, Agent, or Firm*—Cantor Colburn LLP

(57) ABSTRACT

Disclosed is a method of making reduced VOC polymers and coating compositions containing such polymers. Provided is a mixture (I) comprising a reactant mixture (a) of polymerizable components and a nonvolatile solvent ($b_{nv}$) that (i) is not a crystalline solid at 25° C., (ii) is nonvolatile, (iii) comprises at least one functional group ($F_1$) and (iv) is a fluid solid. Reactant mixture (a) is polymerized to provide a polymer (a'). The at least one functional group ($F_1$) of nonvolatile solvent ($b_{nv}$) is reacted with one or more reactants (e) to obtain a nonvolatile solvent ($b'_{nv}$) comprising at least two functional groups ($F_2$). Obtained is a mixture (II) comprising polymer (a') in nonvolatile solvent ($b'_{nv}$) comprising at least two functional groups ($F_2$). The at least one functional group ($F_1$) is substantially nonreactive: (1) with the components of reactive mixture (a), (2) under the polymerization conditions which polymerize reactant mixture (a), and (3) with polymer (a').

4 Claims, No Drawings

OTHER PUBLICATIONS

Ganghui Teng, et al.; End-Grafting of Oligoesters Based on Terephthalic Acid and Linear Diols for High Solids Coatings; Coatings Research Institute, Eastern Michigan University, MI; Journal of Applied Polymer Science, vol. 60 pp. 1609-1618 (1996).

Shubang Gan, et al.; Recent Studies of the Curing of Polyester-Melamine Enamels. Possible Causes of Overbake Softening; Department of Polymers & Coatings, North Dakota University; Feb. 1-3, 1989, New Orleans, LA.

* cited by examiner

METHOD FOR OBTAINING COATING COMPOSITIONS HAVING REDUCED VOC

This application is a divisional of U.S. Ser. No. 10/866,596, filed Jun. 11, 2004, which is a continuation-in-part of U.S. Ser. No. 10/351,079, filed Jan. 23, 2003, which is a divisional of U.S. Pat. No. 6,541,594, filed Dec. 19, 2000.

FIELD OF THE INVENTION

The invention relates to the manufacture of thermosetting polymers and/or oligomers for use in curable coating compositions, especially curable coating compositions having a low or reduced VOC.

BACKGROUND OF THE INVENTION

Curable thermoset coating compositions are widely used in the coatings art. They are often used as topcoats in the automotive and industrial coatings industry. Such topcoats may be basecoats, clearcoats, or mixtures thereof. Color-plus-clear composite coatings are particularly useful as topcoats where exceptional gloss, depth of color, distinctness of image, or special metallic effect is desired. The automotive industry has made extensive use of these coatings for automotive body panels.

Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI). Finally, such composite coatings must also simultaneously provide a desirable balance of finished film properties such as durability, hardness, flexibility, and resistance to environmental etch, scratching, marring, solvents, and/or acids.

In order to obtain the extremely smooth finishes that are generally required in the coatings industry, coating compositions must exhibit good flow before curing. Good flow is observed when the coating composition is fluid enough at some point after it is applied to the substrate and before it cures to a hard film to take on a smooth appearance. Some coating compositions exhibit good flow immediately upon application and others exhibit good flow only after the application of elevated temperatures.

One way to impart fluid characteristics and good flow to a coating composition is to incorporate volatile organic solvents into the composition. These solvents provide the desired fluidity and flow during the coating process, but evaporate upon exposure to elevated curing temperatures, leaving only the coating components behind.

However, the use of such solvents increases the volatile organic content (VOC) of the coating composition. Because of the adverse impact that volatile organic solvents may have on the environment, many government regulations impose limitations on the amount of volatile solvent that can be used. Increasing the percentage nonvolatile (% NV) of a coating composition or decreasing the VOC provides a competitive advantage with respect to environmental concerns, air permitting requirements and cost.

Prior art attempts to improve the VOC of polymers and coating compositions have generally focused on the removal of volatile organic solvents from polymers by methods such as vacuum distillation. However, such techniques have significant disadvantages. First, they generally require the use of more energy and labor that leads to higher costs. Increased costs also result from the disposal of removed solvent. Finally, the viscosity of the stripped polymer often creates processing and manufacturing challenges.

There is thus a continuing desire to reduce the volatile organic content (VOC) of coating compositions and the components of such coating compositions while avoiding the problems of the prior art. This must be done without sacrificing the rheological properties of the coating composition required for trouble-free application of the composition while still maintaining the optimum level of smoothness and appearance. Finally, any such coating composition must continue to provide finished films having a good combination of properties with respect to durability, hardness, flexibility, and resistance to chipping, environmental etch, scratching, marring, solvents, and/or acids.

More particularly, it would be very desirable to provide a method of making film-forming components for coating compositions wherein the film-forming component is polymerized in a material that is inert with respect to polymerization but does not volatilize upon exposure to elevated curing temperature. Ideally, such a material would enter into the film-forming reaction of a thermosetting coating composition. The desired effect of incorporating the material into the final film would be to increase the crosslink density of the cured film and to impart positive film attributes such as etch resistance, flexibility, scratch and mar, or chip resistance.

Accordingly, it would be advantageous to provide economical methods of making binders for curable coating compositions which provide all of the advantages of prior art binders, but that contribute lower levels of volatile organic solvents to the final coating composition while still providing desirable application properties as well as finished films having commercially acceptable appearance and performance properties.

It would also be advantageous to provide a method of making acrylic oligomers and/or polymers for curable coating compositions which provide all of the advantages of prior art acrylic oligomers and binders, but that contribute lower levels of volatile organic solvents to the final coating composition while still providing desirable application properties as well as finished films having commercially acceptable appearance and performance properties.

Finally, it would be especially desirable to provide a method of making film-forming components for curable coating compositions wherein the film-forming component is polymerized in a material that functions as a solvent with respect to the film forming component and that (1) is inert with respect to polymerization, (2) does not contribute to the VOC of a coating composition incorporating said film-forming component, and (3) enters into the film-forming reaction when the coating composition is cured.

SUMMARY OF THE INVENTION

In one exemplary embodiment, the disclosed method comprises providing a mixture (J) comprising a reactant mixture (a) and a nonvolatile solvent ($b_{nv}$), wherein reactant mixture (a) comprises one or more polymerizable components and nonvolatile solvent ($b_{nv}$) (i) is not a crystalline solid at 25° C., (ii) is nonvolatile, (iii) comprises at least one functional group ($F_1$) and (iv) is a fluid solid. The reactant mixture (a) is subjected to polymerization conditions sufficient to polymerize reactant mixture (a) to provide a polymer (a'). The nonvolatile solvent ($b_{nv}$) is subjected to reaction conditions wherein the at least one functional group ($F_1$) of nonvolatile solvent ($b_{nv}$) is reacted with at least one reactant (e) to provide a nonvolatile solvent ($b'_{nv}$) comprising at least two functional groups ($F_2$). The disclosed method results in a mixture (II) of a polymer (a') in a nonvolatile solvent ($b'_{nv}$) comprising at least two functional groups ($F_2$). The at least one functional group ($F_1$) is substantially nonreactive: (1) with the components of reactive mixture (a), (2) under the polymerization conditions in which reactant mixture (a) is polymerized, and (3) with polymer (a').

In another exemplary embodiment, a method of making an acrylic polymer is provided. The disclosed method comprises providing a mixture (I) comprising a reactant mixture (a) and a solvent mixture (b) comprising a nonvolatile solvent ($b_{nv}$), wherein reactant mixture (a) comprises one or more ethylenically unsaturated monomers and nonvolatile solvent ($b_{nv}$) (i) is not a crystalline solid at 25° C., (ii) is nonvolatile, and (iii) comprises at least one functional group ($F_1$), polymerizing the reactant mixture (a) under free radical polymerization conditions in the solvent mixture (b) to provide an acrylic polymer (a'), and subjecting the nonvolatile solvent ($b_{nv}$) to reaction conditions wherein the at least one functional group ($F_1$) of nonvolatile solvent ($b_{nv}$) is reacted with at least one reactant (e) to result in at least two functional groups ($F_2$), said method producing a mixture (II) comprising the acrylic polymer (a') in nonvolatile solvent ($b'_{nv}$), wherein the at least one functional group ($F_1$) is substantially nonreactive: (1) with the components of reactive mixture (a), (2) under the polymerization conditions in which reactant mixture (a) is polymerized, and (3) with polymer (a').

Also disclosed are curable coating compositions comprising a mixture (II) comprising a polymer (a') and a nonvolatile solvent ($b'_{nv}$) comprising at least two functional groups ($F_2$), the mixture (II) made by the process comprising providing a mixture (I) comprising a reactant mixture (a) and a nonvolatile solvent ($b_{nv}$), wherein reactant mixture (a) comprises one or more polymerizable components and the nonvolatile solvent ($b_{nv}$) (i) is not a crystalline solid at 25° C., (ii) is nonvolatile, (iii) comprises at least one functional group ($F_1$), and (iv) is a fluid solid, polymerizing the reactant mixture (a) to provide a polymer (a'), and subjecting nonvolatile solvent ($b_{nv}$) to reaction conditions wherein the at least one functional group ($F_1$) of nonvolatile solvent ($b_{nv}$) is reacted with at least one reactant (e) to obtain at least two functional groups ($F_2$), with the provisos that the functional groups ($F_1$) and ($F_2$) are not the same and the at least one functional group ($F_1$) is substantially nonreactive: (1) with the components of reactive mixture (a), (2) under the polymerization conditions in which reactant mixture (a) is polymerized, and (3) with polymer (a'), and at least one crosslinking agent (f) comprising at least one functional group (fi) which is reactive with functional groups ($F_2$) of nonvolatile solvent ($b'_{nv}$).

Coating compositions of the invention comprising crosslinking agent (f) and a mixture (II) comprising polymer (a') and nonvolatile solvent ($b'_{nv}$) comprising at least two functional groups ($F_2$) provide coating compositions having low or reduced VOCs without any reduction in application or performance properties.

DETAILED DESCRIPTION OF THE INVENTION

The invention provides a method of making a polymer (a'), especially a mixture (II) comprising a polymer (a') and at least one nonvolatile solvent ($b'_{nv}$) comprising at least two functional groups ($F_2$). The mixture (II) of polymer (a') and at least one nonvolatile solvent ($b'_{nv}$) comprising at least two functional groups ($F_2$) is especially suitable for use in coating compositions having low VOCs. In another exemplary embodiment, mixture (II) will comprise a polymer (a') and a solvent mixture (b), wherein solvent mixture (b) comprises at least one nonvolatile solvent ($b'_{nv}$) comprising at least two functional groups ($F_2$).

A 'low VOC polymer or coating composition' as used herein refers to polymers or coating compositions having a volatile organic content (VOC) of no more than about 3.2 lbs. of volatile organic solvent per gallon of polymer or coating composition, in some exemplary embodiments, no more than about 2.4 lbs. of volatile organic solvent per gallon of polymer or coating composition, and in some especially exemplary embodiments, no more than about 1.6 lbs. of volatile organic solvents per gallon of polymer or coating composition.

Mixture (II) results from a multi-step process that requires the polymerization of a reactant mixture (a) in a solvent mixture (b). Solvent mixture (b) will comprise at least one nonvolatile solvent ($b_{nv}$) having at least one functional group ($F_1$). The polymerization of reactant mixture (a) into polymer (a') occurs either before, after, or simultaneously with the reaction of functional group ($F_1$) of the nonvolatile solvent ($b_{nv}$) with at least one reactant (e) to provide a nonvolatile solvent ($b'_{nv}$) having at least two functional groups ($F_2$). That is, at least two separate reactions must occur. The reactant mixture (a) is subjected to polymerization conditions sufficient to polymerize reactant mixture (a) to provide a polymer (a'). The nonvolatile solvent ($b_{nv}$) is subjected to reaction conditions wherein the at least one functional group ($F_1$) of nonvolatile solvent ($b_{nv}$) is reacted with at least one reactant (e) to provide a nonvolatile solvent ($b'_{nv}$) comprising at least two functional groups ($F_2$). In one exemplary embodiment, the two reactions will occur simultaneously. However, it is also possible for either of the two reactions to occur first, so long as both reactions occur at some point prior to the obtainment of mixture (II). It will thus be appreciated that the at least one functional group ($F_1$) is not and may not be the same as functional groups ($F_2$).

Solvent mixture (b) in which reactive mixture (a) is polymerized comprises a particular nonvolatile solvent ($b_{nv}$) that must be substantially inert in three ways to under the polymerization conditions to which reactant mixture (a) is subjected. "Substantially inert" as used herein refers to a degree of reaction between the nonvolatile solvent ($b_{nv}$) and the reaction mixture (a) of less than 3% of the total functionality of nonvolatile solvent ($b_{nv}$), preferably less than 2%, and most preferably less than 1% of the total functionality of nonvolatile solvent (bn). Total functionality as used herein does not include nonaromatic alkenyl groups and reactions of extractable hydrogens. "Extractable hydrogens" as used herein refers to hydrogens attached to either carbon of a carbon-carbon double bond in a nonaromatic alkenyl group.

In a most preferred embodiment, any reaction between nonvolatile solvent ($b_{nv}$) and reaction mixture (a) will be attributable solely to the presence of unwanted impurities and/or contaminants in nonvolatile solvent ($b_{nv}$). Reactions with any nonaromatic alkenyl groups or extractable hydrogens in nonvolatile solvent ($b_{nv}$) are considered to be within the scope of unwanted impurities and/or contaminants in nonvolatile solvent ($b_{nv}$).

First, the nonvolatile solvent ($b_{nv}$) must be substantially inert or nonreactive with any functional groups on components of reactant mixture (a) under the polymerization conditions. Thus, nonvolatile solvent ($b_{nv}$) must generally be free of any functional groups that are reactive with one or more functional groups of the components of reactant mixture (a) under the conditions used to polymerize reactant mixture (a) including free radical reactions or otherwise. Functional groups ($F_1$) of nonvolatile solvent ($b_{nv}$) will thus normally be free of any groups that are reactive with one or more functional groups of the components of reactant mixture (a) under conditions used to polymerize reactant mixture (a). Functional group ($F_1$) of nonvolatile solvent ($b_{nv}$) thus does not include nonaromatic alkenyl groups or extractable hydrogens.

Second, the nonvolatile solvent ($b_{nv}$) must be substantially inert or nonreactive during the polymerization of reactant mixture (a). That is, nonvolatile solvent ($b_{nv}$) may not polymerize under the polymerization conditions that result in the transformation of reactant mixture (a) into polymer (a').

Finally, the nonvolatile solvent ($b_{nv}$) must be substantially inert or nonreactive with the resulting polymer (a') while under the polymerization conditions used to polymerize reactant mixture (a). For example, if an epoxy functional component and an acid functional component are polymerized to provide an epoxy upgrade polymer, the nonvolatile solvent ($b_{nv}$) may not have any functional groups reactive with the secondary hydroxyl formed by the ring opening of the oxirane functional group.

In one exemplary embodiment, the functional group ($F_1$) of nonvolatile solvent ($b_{nv}$) is limited to those functional groups which may be on one or more components of reactant mixture (a) but which do not enter into the polymerization processes of reactant mixture (a) or any graft polymerization processes involving reactant mixture (a) or polymer (a'). The at least one functional group ($F_1$) of nonvolatile solvent ($b_{nv}$) does not include nonaromatic alkenyl groups or extractable hydrogens.

Polymer (a') may be any polymer, oligomer or mixture thereof, resulting from the polymerization of reactant mixture (a). As used herein polymer (a') may generally have a number average molecular weight of from 400 to 50,000 Daltons. Usually, the polymer (a') will have a number average molecular weight of from 1000 to 50,000 Daltons. Polymer (a') may be an acrylic polymer, a polyurethane polymer, a polyester polymer, an epoxy upgrade polymer, a dendrimer polymer, or the like. In one exemplary embodiment, polymer (a') will be an acrylic polymer, a polyurethane polymer, or a polyester polymer. In one especially exemplary embodiment, polymer (a') will be an acrylic polymer or a polyurethane polymer, with acrylic polymers being especially preferred.

It will be appreciated that the composition of reactant mixture (a) will depend upon the desired type of polymer (a'). In general, reactant mixture (a) will be comprised of one or more components, preferably two or more components that can be subjected to polymerization conditions to produce a polymer (a'). More preferably the component of reactant mixture (a) will be monomers or compounds that can react with each other and/or compounds produced therefrom, to provide a polymer of increased molecular weight relative to the initial starting reactants of reactant mixture (a).

The polymerization of reactant mixture (a) to polymer (a') may be heterogenous, i.e., aqueous emulsion or nonaqueous dispersion, or homogenous, i.e., solution polymerization. Homogenous polymerization process are preferred.

If polymer (a') is an acrylic polymer, reactant mixture (a) will be comprised of ethylenically unsaturated monomers having at least one carbon-carbon double bond able to undergo free radical polymerization.

Illustrative ethylenically unsaturated monomers include, without limitation, alpha, beta-ethylenically unsaturated monocarboxylic acids containing 3 to 5 carbon atoms such as acrylic, methacrylic, and crotonic acids, and the esters, nitriles, and amides of those acids; alpha, beta-ethylenically unsaturated dicarboxylic acids containing 4 to 6 carbon atoms and the anhydrides, monoesters, and diesters of those acids; vinyl esters, vinyl ethers, vinyl ketones, and aromatic or heterocylic aliphatic vinyl compounds. Carbamate functional ethylenically unsaturated monomers, cyclic carbonate functional ethylenically unsaturated monomers, and/or isocyanate functional ethylenically unsaturated monomers may also be used, most preferably in combination with other ethylenically unsaturated monomers.

Representative examples of suitable esters of acrylic methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cycolhexyl, trimethylcyclohexyl, tetrahydrofurfuryl, stearyl, sulfoethyl, and isobornyl acrylates, methacrylates, and crotonates; and polyalkylene glycol acrylates and methacrylates.

Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol.

Representative examples of polymerizable vinyl monomers include, without limitation, such compounds as vinyl acetate, vinyl propionate, vinyl ethers such as vinyl ethyl ether, vinyl and vinylidene halides, and vinyl ethyl ketone.

Representative examples of aromatic or heterocyclic aliphatic vinyl compounds include, without limitation, such compounds as styrene, alpha-methyl styrene, vinyl toluene, tert-butyl styrene, and 2-vinyl pyrrolidone.

Representative examples include acrylic and methacrylic acid amides and aminoalkyl amides, acrylonitrile, and methacrylonitriles.

Other suitable examples include acrylates or methacrylates having hydroxy, epoxy, or other functional groups, such as hydroxyalkyl acrylates and methacrylates, glycidyl esters of methacrylic and acrylic acid such as glycidyl methacrylate, and aminoalkyl esters of methacrylic or acrylic acid like N,N-dimethylaminoethyl(meth)acrylate.

Acrylic monomers having carbamate functionality in the ester portion of the monomer are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

Ethylenically unsaturated isocyanate monomers are well-known in the art and include meta-isopropenyl-.alpha.,.alpha.-dimethylbenzyl isocyanate (sold by American Cyanamid as TMI®) and isocyanatoethyl methacrylate.

Cyclic carbonate ethylenically unsaturated monomers are well-known in the art and include (2-oxo-1,3-dioxolan-4-yl) methyl methacrylate.

When polymer (a') is an acrylic resin, it will generally have a number average molecular weight of from 1000 to 50,000, preferably from 10,000 to 25,000, with molecular weights of from 15,000 to 20,000 being most preferred.

In a preferred embodiment, polymer (a') will be a hydroxyl or carbamate functional resin which may or may not be water dispersible. For example, in one preferred embodiment, polymer (a') will be a water dispersible acrylic polymer having a hydroxyl equivalent weight of from 250 to 1500 g/mole and an acid equivalent weight of from 500 to 3000 g/mole. In another preferred embodiment, the polymer (a') will be a water dispersible acrylic polymer having a carbamate equivalent weight of from 250 to 1500 g/mole and an acid equivalent weight of from 500 to 3000 g/mole. In another preferred embodiment, the polymer (a') is an acrylic polymer having a hydroxyl equivalent weight of from 250 to 1500 g/mole and an acid equivalent weight greater than 3000 g/mole. Finally, in another preferred embodiment, the polymer (a') is an acrylic polymer having a carbamate equivalent weight of from 250 to 1500 g/mole and an acid equivalent weight greater than 3000 g/mole.

If polymer (a') is a polyester, reactant mixture (a) will be comprised of a mixture of at least one polycarboxylic acid and/or anhydride, and at least one polyol and/or epoxide. Such reactants will be subjected to polymerization via esterification.

In one embodiment, the polycarboxylic acids used to prepare a polyester polymer (a') will generally be monomeric polycarboxylic acids or anhydrides thereof having 2 to 18 carbon atoms per molecule. Among useful acids are phthalic acid, hexahydrophthalic acid, adipic acid, sebacic acid, maleic acid, and other dicarboxylic acids of various types. Minor amounts of monobasic acids can be included in the reaction mixture (a'), for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare a polyester polymer (a') include diols such as alkylene glycols. Specific examples include ethylene glycol, 1,6-hexanediol, neopentyl glycol, and 2,2-dimethyl-3-hydroxypropionate. Other suitable glycols include hydrogenated bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, mixtures thereof and the like.

Although the polyol component of reactant mixture (a) can be comprised of all diols, polyols of higher functionality can also be used. In one exemplary embodiment, the polyol component will be a mixture comprising at least one diol, and at least one polyol of higher functionality such as a triol. Examples of polyols of higher functionality would include trimethylol ethane, trimethylol propane, pentaerythritol, and the like. Triols are preferred. In one exemplary embodiment, the mole ratio of polyols of higher functionality to diol is less than 3.3/1, preferably up to 1.4/1. Limited amounts of monofunctional alcohols, such as ethylhexanol, may also be used.

Polyurethane polymers (a') may be prepared by the polymerization of a reactant mixture (a) comprising at least one di- and/or polyisocyanate and at least one polyol. They are prepared by a chain extension reaction of a polyisocyanate (e.g., hexamethylene diisocyanate, isophorone diisocyanate, MDI, etc.) and an active hydrogen-containing chain extension agent, such as a polyol. They can be provided with active hydrogen functional groups by capping the polyurethane chain with an excess of diol, polyamine, amino alcohol, or the like that are included in reactant mixture (a).

For example, suitable polyisocyanates can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylenediisocyanate and para-xylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of $\alpha'$, $\alpha'$, $\alpha'$, $\alpha$-tetramethyl xylylene diisocyanate can be used. Also useful as the polyisocyanate are isocyanurates such as DESMODUR® N 3300 from Mobay and biurets of isocyanates such as DESMODUR® N100 from Mobay.

Active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. Both primary and secondary amine groups are considered as having one active hydrogen. Active hydrogen-containing chain extension agents also include water. In one preferred embodiment of the invention, a polyol is used as the chain extension agent, to provide a polyurethane. Illustrative polyols are those as described above with respect to polyesters polymers (a'). In an especially preferred embodiment, a diol is used as the chain extension agent with little or no higher polyols, to minimize branching. In one exemplary embodiment, illustrative polyols include 1,6 hexanediol, cyclohexanedimethylol, and 1,4-butanediol. While polyhydroxy compounds containing at least three hydroxyl groups may be used as chain extenders, the use of these compounds produces branched polyurethane resins. These higher functional polyhydroxy compounds include, for example, trimethylolpropane, trimethylolethane, pentaerythritol, among other compounds.

Monofunctional capping alcohols such as 2-ethylhexanol may also be used. The mono- or polyfunctional alcohol may contain additional functional groups. Non-limiting examples are glycidol, hydroxyalkylcarbamates such as hydroxy ethyl carbamate or hydroxy butyl carbamate, and hydroxy acids such as 1-hydroxybutylic acid.

The polyurethane polymer (a') may be chain extended in any manner using those compounds having at least two active hydrogen groups. Accordingly, reactant mixture (a) may thus include a mixture of polyisocyanate, polyol, and multi-functional compounds.

In one especially exemplary embodiment, the reactant mixture (a) is present in a mixture (I) with a solvent mixture (b) that comprises a nonvolatile solvent ($b_{nv}$). In one exemplary embodiment, the reactant mixture (a) will be soluble in nonvolatile solvent ($b_{nv}$).

Illustrative examples of suitable nonvolatile solvents ($b_{nv}$) are generally those materials that may be an amorphous solid, wax, or liquid at room temperature but are nonetheless a fluid solid at the temperature that the polymerization reaction of reactant mixture (a) occurs. "Nonvolatile" as used herein refers to materials having a boiling point at least 100° C., preferably 200° C., most preferably 300° C., above the polymerization temperature. A "fluid solid" refers to a nonvolatile material that has a viscosity similar to a traditional solvent at the polymerization temperature.

In one embodiment, the nonfunctional part of suitable nonvolatile solvents ($b_{nv}$) will have from 8 to 300 carbons. In another embodiment, nonvolatile solvent ($b_{nv}$) will be have at least one functional group ($F_1$), while in one exemplary embodiment; nonvolatile solvent ($b_{nv}$) will have at least two functional groups ($F_1$). In another embodiment, nonvolatile solvent ($b_{nv}$) will be substantially free of heteroatoms as discussed below. Other illustrative examples for suitable nonvolatile solvents ($b_{nv}$) include diethyl octanediol, neodecanoic acid, the glycidyl ester of neodecanoic acid, the cyclic carbonate of the glycidyl ester of neodecanoic acid, alpha polyolefinpolyols, alpha polyolefin polyacids, and the like.

In another embodiment, suitable nonvolatile solvents ($b_{nv}$) may also comprise heteroatom containing linking groups, i.e. containing atoms other than carbon or hydrogen. Illustrative examples of such heteroatom containing linking groups include ethers, ureas, esters, urethanes, silanes and the like.

In one especially exemplary embodiment, the nonvolatile solvent ($b_{nv}$) will be a reactive component (c). In one embodiment, the non-functional part of reactive component (c) will have from 12 to 72 carbons, more preferably from 18 to 54 carbons, and most preferably from 36 to 54 carbons. In one particularly exemplary embodiment, the nonfunctional part of reactive component (c) will have 36 carbons and at least two functional groups ($F_1$).

In one exemplary embodiment, reactive component (c) will be substantially free of heteroatoms. "Heteroatom" as used herein refers to atoms other than carbon or hydrogen. The phrase "substantially without" heteroatoms as used herein means that the portion of reactive component (c) which does not include functional groups ($F_1$) will generally have no more than two atoms which are other than carbon or hydrogen, i.e., atoms such as N, O, Si, mixtures thereof, and the like. More preferably, that portion of reactive component (c) that does not include functional groups ($F_1$) will have no more than two atoms that are other than carbon or hydrogen. In a particularly exemplary embodiment, that portion of reactive component (c) that does not include functional groups ($F_1$) will have no heteratoms, i.e., will consist solely of carbon and hydrogen atoms. Thus, in a most preferred aspect of the invention, the only heteratoms in reactive component (c) will be present in functional groups ($F_1$).

In one exemplary embodiment, reactive component (c) will not be a crystalline solid at room temperature, i.e., at temperatures of from 65 to 75° F. "Crystalline" refers to a solid characterized by a regular, ordered arrangement of particles. Rather, in this embodiment, reactive component (c) will be an amorphous solid, a wax or a liquid at room temperature. "Amorphous" refers to a noncrystalline solid with no well-defined ordered structure.

In another exemplary embodiment, reactive component (c) will comprise a mixture of two or more saturated or unsaturated structures selected from the group consisting of noncyclic structures for reactive component (c), aromatic-containing structures for reactive component (c), cyclic-containing structures for reactive component (c), and mixtures thereof. Saturated structures are preferred, especially where durability issues are of concern. For example, a most preferred reactive component (c) will comprise a mixture of two or more structures selected from the group consisting of aliphatic structures for reactive component (c), aromatic-containing structures for reactive component (c), cycloaliphatic-containing structures for reactive component (c), and mixtures thereof It is particularly preferred that reactive component (c) comprise at least two, more preferably three, of the three cited structures. If reactive component (c) comprises only two of the three cited structures for reactive component (c), then at least one of the two structures must be present as a mixture of two or more isomers thereof For example, the mixture of reactive components (c) may comprise at least one aliphatic structure for reactive component (c) and at least one other structure for reactive component (c) selected from the group consisting of aromatic-containing structures for reactive component (c), cycloaliphatic-containing structures for reactive component (c), and mixtures thereof If the 'at least one other structure for reactive component (c)' is not a mixture of aromatic-containing structures for reactive component (c) and cycloaliphatic-containing structures for reactive component (c), either the aromatic-containing structures or the cycloaliphatic containing structures must be present as a mixture of two or more isomers.

Alternatively, the mixture of reactive components (c) may comprise at least one aromatic-containing structure for reactive component (c) and at least one other structure for reactive component (c) selected from the group consisting of aliphatic structures for reactive component (c), cycloaliphatic-containing structures for reactive component (c), and mixtures thereof If the 'at least one other structure for reactive component (c)' is not a mixture of aliphatic structures for reactive component (c) and cycloaliphatic-containing structures for reactive component (c), either the aliphatic structures or the cycloaliphatic containing structures must be present as a mixture of two or more isomers.

In a most preferred embodiment, reactive component (c) will comprise one or more aliphatic structures for reactive component (c), one or more aromatic-containing structures for reactive component (c), and one or more cycloaliphatic-containing structures for reactive component (c). Particularly advantageous mixtures of reactive component (c) will comprise from 3 to 25% by weight of reactive component (c) having an aliphatic structure, from 3 to 25% by weight of reactive component (c) having an aromatic-containing structure, and 50 to 94% by weight of reactive component (c) having a cycloaliphatic-containing structure. More preferred mixtures of reactive component (c) will comprise from 3 to 18% by weight of reactive component (c) having an aliphatic structure, from 5 to 23% by weight of reactive component (c) having an aromatic-containing structure, and 55 to 85% by weight of reactive component (c) having a cycloaliphatic-containing structure. Most preferred mixtures of reactive component (c) will comprise from 5 to 10% by weight of reactive component (c) having an aliphatic structure, from 10 to 20% by weight of reactive component (c) having an aromatic-containing structure, and 60 to 70% by weight of reactive component (c) having a cycloaliphatic-containing structure.

In one exemplary embodiment, reactive component (c) will comprise at least two functional groups ($F_1$) per molecule. Preferred reactive components (c) may have from two to six functional groups ($F_1$) while most preferably reactive component (c) will have two to three functional groups ($F_1$).

Functional groups ($F_1$) of nonvolatile solvent ($b_{nv}$) may be selected from a variety of active hydrogen containing groups and groups reactive with such active hydrogen containing groups. Examples of illustrative functional groups ($F_1$) are hydroxy, isocyanate (blocked or unblocked), epoxy, carbamate, aminoplast, aldehyde, acid, epoxy, amine, cyclic carbonate, urea, mixtures thereof, and the like.

Preferred functional groups ($F_1$) are hydroxyl both primary and secondary, primary carbamate, isocyanate, aminoplast functional groups, epoxy, carboxyl and mixtures thereof Most preferred functional groups ($F_1$) are secondary hydroxyl, primary carbamate, and mixtures thereof, with primary carbamate groups being particularly preferred.

Illustrative examples of suitable nonvolatile solvents ($b_{nv}$) having functional groups ($F_1$) which are carboxyl are fatty acids and addition reaction products thereof, such as dimerized, trimerized and tetramerized fatty acid reaction products and higher oligomers thereof Suitable acid functional dimers and higher oligomers may be obtained by the addition reaction of $C_{12-18}$ monofunctional fatty acids. Suitable monofunctional fatty acids may be obtained from Cognis Corporation of Ambler, Pa. Such materials will be acid functional and will contain some unsaturation. In addition, saturated and unsaturated dimerized fatty acids are commercially available from Uniqema of Wilmington, Del.

Hydroxyl functional nonvolatile solvents ($b_{nv}$) are commercially available as the Pripol™ saturated fatty acid dimer (Pripol™ 2033) supplied by Uniqema of Wilmington, Del. Hydroxyl functional nonvolatile solvents ($b_{nv}$) may also be obtained by reduction of the acid group of the above-discussed fatty acids.

Nonvolatile solvents ($b_{nv}$) having two or more carbamate functional groups may be obtained via the reaction of the hydroxyl functional nonvolatile solvents ($b_{nv}$) with a low molecular weight carbamate functional monomer such as methyl carbamate under appropriate reaction conditions. Alternatively, carbamate functional nonvolatile solvents ($b_{nv}$) may be made via decomposition of urea in the presence of hydroxyl functional nonvolatile solvents ($b_{nv}$) as described above. Finally, carbamate functional nonvolatile solvents ($b_{nv}$) can be obtained via the reaction of phosgene with the hydroxyl functional nonvolatile solvents ($b_{nv}$) followed by reaction with ammonia.

Amine groups suitable for use as functional group ($F_1$) may be primary or secondary, but primary amines are most preferred. Nonvolatile solvents ($b_{nv}$) having amine functional groups ($F_1$) may be obtained via reaction of the acid functional nonvolatile solvents ($b_{nv}$) to form an amide, followed by conversion to a nitrile and subsequent reduction to an amine.

Nonvolatile solvents ($b_{nv}$) having isocyanate functional groups ($F_1$) may be obtained via reaction of the amine functional nonvolatile solvent ($b_{nv}$) described above with carbon dioxide.

Aminoplast functional groups may be defined as those functional groups resulting from the reaction of an activated amine group and an aldehyde or formaldehyde. Illustrative activated amine groups are melamine, benzoguanamine, amides, carbamates, and the like. The resulting reaction product may be used directly as functional group ($F_1$) or may be etherified with a monofunctional alcohol prior to use as functional group ($F_1$).

Nonvolatile solvents ($b_{nv}$) having aminoplast functional groups ($F_1$) may be made via reaction of carbamate functional nonvolatile solvents ($b_{nv}$) as described above with formaldehyde or aldehyde. The resulting reaction product may optionally be etherified with low boiling point alcohols.

Nonvolatile solvents ($b_{nv}$) having aldehyde functional groups ($F_1$) may be made via reduction of the acid functional nonvolatile solvents ($b_{nv}$) described above.

Nonvolatile solvents ($b_{nv}$) having urea functional groups ($F_1$) may be made via reaction of an amine functional nonvolatile solvent ($b_{nv}$) with urea. Alternatively, amine functional nonvolatile solvents ($b_{nv}$) can be reacted with phosgene followed by reaction with ammonia to produce the desired urea functional groups ($F_1$).

Nonvolatile solvents ($b_{nv}$) having epoxy functional groups ($F_1$) may be made using either saturated or unsaturated fatty acids described above. If an unsaturated fatty acid is used, reaction with peroxide will form internal epoxy groups. More preferably, an acid or hydroxyl functional nonvolatile solvents ($b_{nv}$) will be reacted with epichlorohydrin. Preferred epoxy functional nonvolatile solvents ($b_{nv}$) will be obtained using saturated starting materials.

Nonvolatile solvents ($b_{nv}$) having cyclic carbonate functional groups ($F_1$) may be made via carbon dioxide insertion into an epoxy functional nonvolatile solvents ($b_{nv}$) as described above.

In one exemplary embodiment, nonvolatile solvents ($b_{nv}$) will comprise one or more of the following structures:

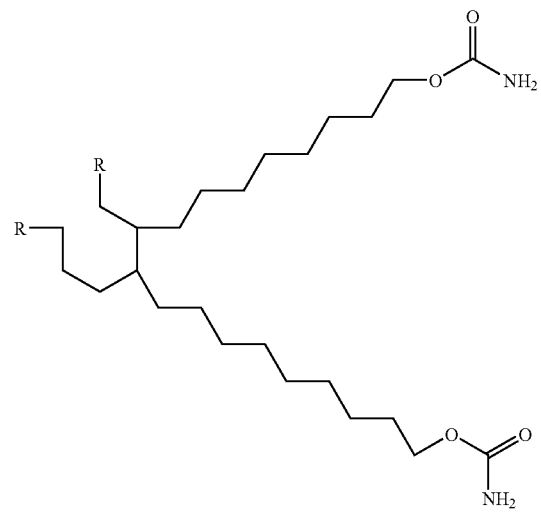

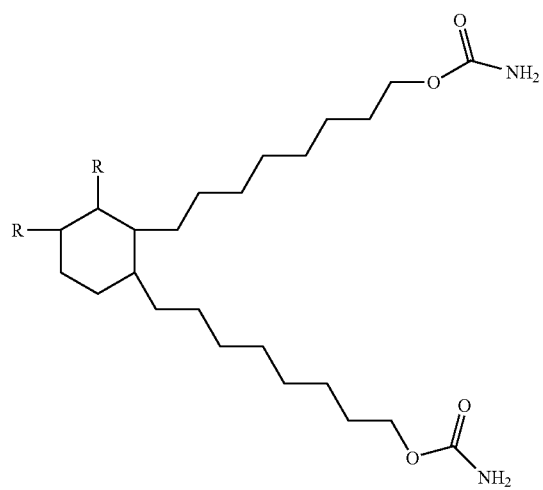

-continued

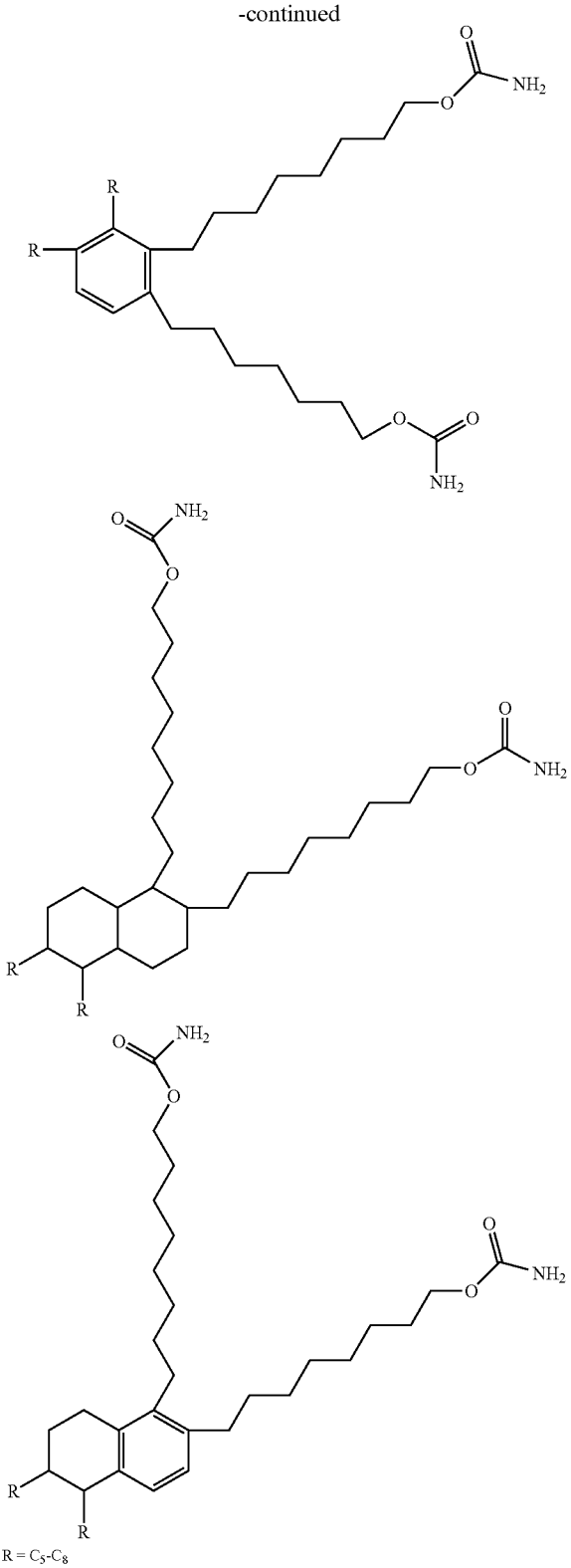

R = C₅-C₈

As discussed above, in one exemplary embodiment, nonvolatile solvent ($b_{nv}$) will be substantially nonreactive under the polymerization conditions: (1) with the components of reactive mixture (a), (2) in the polymerization of reactant mixture (a) and (3) with the polymer (a'). Thus, the functional groups ($F_1$) of nonvolatile solvents ($b_{nv}$) discussed above must be selected so as not to participate in the polymerization reaction of reactant mixture (a). The functional groups ($F_1$) must also not react with any of the functional groups of the components reactant mixture (a) and/or on polymer (a').

For example, when nonvolatile solvent ($b_{nv}$) is used in a free radical acrylic polymerization where reactive mixture (a) comprises an isocyanate functional monomer, the functional groups ($F_1$) of nonvolatile solvent ($b_{nv}$) may not be hydroxy or amine. When high polymerization temperatures are used in an embodiment, (such as 140° C.), functional group ($F_1$) of nonvolatile solvents ($b_{nv}$) may not be acid functional.

Alternatively, when nonvolatile solvents ($b_{nv}$) is used in an embodiment employing an ionic or similar polymerization, the level of non-aromatic unsaturated groups on nonvolatile solvent ($b_{nv}$) must be minimized, preferably to a level of less than 5 weight percent, more preferably less than 2 weight percent, based on the total weight of nonvolatile solvents ($b_{nv}$). In another example, functional groups ($F_1$) should not contain any groups that would react with the isocyanate or active proton source (usually hydroxy) when the nonvolatile solvents ($b_{nv}$) is used in a urethane polymerization. The typical functional groups on nonvolatile solvents ($b_{nv}$) that should be avoided in this case are hydroxy and amine groups. Other functional groups on nonvolatile solvents ($b_{nv}$) might also have to be avoided depending on the nature of any functional groups on the active hydrogen material. For example, if glycidol is used as a capping group in the urethane polymerization, the nonvolatile solvents ($b_{nv}$) must be free of acid groups.

When the nonvolatile solvents ($b_{nv}$) is used in a polyester polymerization, functional groups ($F_1$) should not be any groups that will react with anhydrides, acids, and alcohols. Examples of such groups to be avoided include acids, hydroxy, epoxy, unblocked isocyanates and the like. In such as case, non-limiting examples of functional groups ($F_1$) of nonvolatile solvents ($b_{nv}$) would be carbamate, vinyl or mixtures thereof.

Finally, it is within the scope of the invention that nonvolatile solvents ($b'_{nv}$) may have functional groups that are also reactive with polymer (a') when exposed to cure conditions, but are inert during polymerization conditions. A non-limiting example of this would be use of a ketamine functionalized nonvolatile solvent ($b'_{nv}$) with an epoxy, cyclic carbonate and/or isocyanate functional acrylic polymer.

In addition to nonvolatile solvent ($b_{nv}$) or nonvolatile solvent ($b'_{nv}$), solvent mixture (b) may further comprise other solvents and/or cosolvents such as water and/or organic solvents. Illustrative solvents include aromatic hydrocarbons, such as, petroleum naphtha or xylenes, ketones such as methyl amyl ketone, methyl isobutyl ketone, methyl ethyl ketone or acetone; esters such as butyl acetate or hexyl acetate; and glycol ether esters, such as propylene glycol monomethyl ether acetate. Other examples of useful solvents include, without limitation, m-amyl acetate, ethylene glycol butyl ether-acetate, xylene, N-methylpyrrolidone, blends of aromatic hydrocarbons, and mixtures of these.

In one embodiment, solvent mixture (b) will comprise from 0 to 95% by weight of nonvolatile solvent ($b_{nv}$), in another embodiment, from 0 to 75% by weight, and in a particularly exemplary embodiment, from 0 to 20% by weight, all based on the total weight of solvent mixture (b).

Coating compositions of the invention will comprise a mixture (II) made by the method of the invention wherein mixture (II) comprises polymer (a') and the solvent mixture (b) comprising a nonvolatile solvent ($b'_{nv}$). Coating compositions of the invention may further comprise other known film-forming binders not made by the method of the invention, but most preferably will not. Illustrative examples of other binders that bay be used in addition to polymer (a') include acrylic polymers, polyurethane polymers, polyester polymers, epoxy functional polymers, mixtures thereof, and the like.

In general, coating compositions of the invention will comprise from 10 to 90% by weight nonvolatile of polymer (a'), more preferably from 20 to 80% by weight nonvolatile of polymer (a') and most preferably from 40 to 60% by weight nonvolatile of polymer (a'), based on the total weight of the total nonvolatile of the coating composition.

For the coating compositions of the invention, solvent mixture (b) will generally have from 5 to 100% by weight of nonvolatile solvent ($b'_{nv}$), more preferably from 30 to 100% by weight of nonvolatile solvent ($b'_{nv}$), and most preferably from 80 to 100% by weight of nonvolatile solvent ($b'_{nv}$), all based on the total weight of solvent mixture (b).

Nonvolatile solvent ($b_{nv}$) is reacted with at least one reactant (e) to provide a nonvolatile solvent ($b'_{nv}$) comprising at least two functional groups ($F_2$). As previously indicated, such reactions may occur before, during or after the polymerization of reactant mixture (a) to polymer (a'). In one exemplary embodiment, the reaction of nonvolatile solvent ($b_{nv}$) with at least one reactant (e) will occur during and after the polymerization of reactant mixture (a).

In one exemplary embodiment, functional group ($F_2$) will be any one of a pair of reactants that would result in a thermally irreversible chemical linkage upon reaction with a crosslinking agent (f). The term "thermally irreversible linkage" refers to a linkage the reversal of which is not thermally favored under the traditional cure schedules used for automotive coating compositions. Illustrative examples of suitable thermally irreversible chemical linkages are urethanes, ureas, esters and ethers. Preferred thermally irreversible chemical linkages are urethanes, ureas and esters, with urethane linkages being most preferred. Such chemical linkages will not break and reform during the crosslinking process as is the case with the linkages formed via reaction between hydroxyl groups and aminoplast resins.

It will be appreciated that in this exemplary embodiment, if one member of a "pair" is selected for use as functional group ($F_2$), the other member of the "pair" will generally be selected as functional group (fi) of crosslinking agent (f) discussed below. Examples of illustrative reactant "pairs" are hydroxy/isocyanate (blocked or unblocked), hydroxy/epoxy, carbamate/aminoplast, carbamate/aldehyde, acid/epoxy, amine/cyclic carbonate, amine/isocyanate (blocked or unblocked), urea/aminoplast, and the like.

Thus, in one embodiment, functional groups ($F_2$) of nonvolatile solvent ($b'_{nv}$) may be any of the functional groups discussed above with respect to functional group ($F_1$) of nonvolatile solvent ($b_{nv}$). However, it will be appreciated that functional groups ($F_2$) may not be the same as functional groups ($F_1$). That is, nonvolatile solvent ($b_{nv}$) will undergo reaction with at least one reactant (e) to produce nonvolatile solvent ($b'_{nv}$). The reaction of nonvolatile solvent ($b_{nv}$) with at least one reactant (e) produces nonvolatile solvent ($b'_{nv}$) comprising at least two functional groups ($F_2$).

In one exemplary embodiment, functional groups ($F_2$) of nonvolatile solvent ($b'_{nv}$) will be at least one of carbamate (especially primary carbamate), hydroxyl, isocyanate, carbonate, beta-hydroxy urethane, mixtures thereof, and the like. In another exemplary embodiment, functional groups ($F_2$) of nonvolatile solvent ($b'_{nv}$) will be either primary carbamate or hydroxyl. In one especially exemplary embodiment, functional groups ($F_2$) of nonvolatile solvent ($b'_{nv}$) will be primary carbamate.

Illustrative reactants (e) are any reactants that may be used to convert functional groups ($F_1$) of nonvolatile solvent ($b_{nv}$) to functional groups ($F_2$) of nonvolatile solvent ($b'_{nv}$). Illustrative reactions and reactants (e) are generally discussed above with respect to the formation of preferred reactive components (c). It will be appreciated that the identity of the at least one reactant (e) will be dependent upon the identity of functional group ($F_1$) and the desired functional groups ($F_2$). Multiple reactants (e) may be used either simultaneously or sequentially.

Hydroxyl functional groups ($F_2$) or intermediate hydroxyl functional groups may be obtained by the ring opening of an epoxy functional group ($F_1$) with an acid functional reactant (e). When only one epoxy functional group ($F_1$) is present, acid functional reactant (e) must have an additional functional group such as hydroxy, carbamate, urea, amide, and the like.

For example, carbamate functional groups ($F_2$) may be obtained via the reaction of hydroxy functional groups ($F_1$) with a reactant (e) selected from low molecular weight carbamate functional monomers such as methyl carbamate. Alternatively, carbamate functional groups ($F_2$) may be made by decomposing a reactant (e) such as urea in the presence of hydroxyl functional groups ($F_1$). Finally, in another embodiment, carbamate functional groups ($F_2$) may be obtained by reacting a first reactant (e) such as phosgene with a hydroxyl functional group ($F_1$) followed by reaction with another reactant (e) such as ammonia.

Amine functional groups ($F_2$) may be obtained via reduction of a nitrile via reaction with a reactant (e) such as hydrogen gas.

Isocyanate functional groups ($F_2$) may be obtained via reaction of an amine functional group ($F_1$) with a reactant (e) such as phosgene or carbon dioxide, with phosgene being preferred.

Aminoplast functional groups ($F_2$) may be obtained via the reaction of an activated amine functional group ($F_1$) and a reactant (e) that is an aldehyde such as formaldehyde. Illustrative activated amine groups are melamine, benzoguanamine, amides, carbamates, and the like. Alternatively, aminoplast functional groups ($F_2$) may be made via reaction of carbamate functional groups ($F_1$) with a reactant (e) that is an aldehyde. In another embodiment, the resulting aminoplast functional group may be etherified via reaction with another reactant (e) such as a monofunctional alcohol.

Aldehyde functional groups ($F_2$) may be made via reduction of an acid functional group ($F_1$) via reaction with at least one reactant (e) such as hydrogen.

Urea functional groups ($F_2$) may be made via reaction of an amine functional group ($F_1$) with a reactant (e) such as urea. Alternatively, urea functional groups ($F_2$) can be obtained via reaction of amine functional groups ($F_1$) with a reactant (e) such as phosgene followed by additional reaction with another reactant (e) such as ammonia.

Epoxy functional groups ($F_2$) may be made via reaction of acid functional groups ($F_1$) with a reactant (e) such as peroxide. Alternatively, epoxy functional groups ($F_2$) will be obtained via the reaction of acid or hydroxyl functional groups ($F_1$) with a reactant (e) such as epichlorohydrin.

Cyclic carbonate functional groups ($F_2$) may be made via reaction of an epoxy functional group ($F_1$) with a reactant (e) such as carbon dioxide.

It will be appreciated that in some cases, the reaction of a reactant (e) with a nonvolatile solvent ($b_{nv}$) having only one functional group ($F_1$) will produce a nonvolatile solvent ($b'_{nv}$)

having two or more functional groups ($F_2$). For example, the reaction of an epoxy functional group ($F_1$) with a hydroxy acid reactant (e) results in a diol, while the reaction of a cyclic carbonate ($F_1$) with ammonia (reactant (e)) results in a hydroxy carbamate (beta or higher). Finally, the reaction of a cyclic anhydride with a hydroxy acid results in a di-acid.

It will thus be appreciated that in one exemplary embodiment, reactant (e) may be at least one of low molecular weight carbamate functional reactants (such as simple alkyl carbamates), urea, phosgene, ammonia, carbon dioxide, acids, aldehydes, alcohols, peroxides, epichlorohydrin, mixtures thereof, and the like. In another exemplary embodiment, when functional group ($F_1$) is hydroxyl, (e) may be an alkyl carbamate, urea, or phosgene and ammonia. In one especially exemplary embodiment, reactant (e) will be an alkyl carbamate when functional group ($F_1$) is hydroxyl.

The reaction conditions suitable for the reaction of functional groups ($F_1$) with at least one reactant (e) will generally be known to those of skill in the art.

As discussed above, the polymerization of reactant mixture (a) into polymer (a') may occur either before, after, or simultaneously with the reaction of functional groups ($F_1$) of the nonvolatile solvent ($b_{nv}$) with the least one reactant (e) to provide nonvolatile solvent ($b'_{nv}$) having at least two functional groups ($F_2$). In one exemplary embodiment, the two reactions will occur simultaneously. However, it is also possible for either of the two reactions to occur first, so long as both reactions occur at some point prior to the obtainment of mixture (II).

In one exemplary embodiment, the reactant mixture (a) will be polymerized either before or simultaneously with the conversion of nonvolatile solvent ($b_{nv}$) to nonvolatile solvent ($b'_{nv}$). In this case, some or all of any functional groups present on polymer (a') may undergo conversion simultaneously. For example, in one exemplary embodiment, the conversion of hydroxyl functional monomers (a) to carbamate functional monomers (a) may occur simultaneously with polymerization of monomers (a) and the conversion of hydroxy functional groups ($F_1$) to carbamate functional groups ($F_2$).

Coating compositions of the invention will also comprise at least one crosslinking agent (f). Crosslinking agent (f) will comprise at least one functional group (fi) that is reactive with functional groups ($F_2$) of nonvolatile solvent ($b'_{nv}$). Crosslinking agent (f) may further comprise additional functional groups (fii) that are reactive with any functional groups of polymer (a'). The disclosed coating compositions may comprise one or more crosslinking agents (f), wherein functional groups (fi) and (fii) are on the same or different crosslinking agents (f). In one exemplary embodiment, a disclosed coating composition will comprise at least one crosslinking agent (f) having both functional groups (fi) and (fii).

Illustrative examples of crosslinking agents (f) are those crosslinking agents having one or more crosslinkable functional groups. Such functional groups include, for example, aminoplast, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful crosslinkable functional groups include hydroxy, epoxy, acid, anhydride, silane, activated methylene and acetoacetate groups. Preferred crosslinking agents will have crosslinkable functional groups that include hydroxy functional groups and amino functional groups and isocyanate groups. Di- and/or polyisocyanates and/or aminoplast resins are most preferred for use as crosslinking agents in coating compositions comprising the mixture (II) of the invention. Mixed crosslinkers may also be used.

For example, when the nonvolatile solvent ($b'_{nv}$) comprises hydroxy functional groups ($F_2$), for example, the reactant (e) may be an aminoplast resin, a polyisocyanate, a blocked polyisocyanate resin (including an isocyanurate, biuret, or the reaction product of a diisocyanate and a polyol having less than twenty carbon atoms), or an acid or anhydride functional crosslinking agent.

In one exemplary embodiment, the crosslinker (f) will have functional groups (fi), that will react with the functional groups ($F_2$) to form a crosslink that is non-reversible under cure conditions. This will help to insure that the reactive additive remains crosslinked in the film. Some non-limiting examples of crosslinkable functional groups pairs that fall under this category are: carbamate:aminoplast, hydroxy:epoxy, acid:epoxy, vinyl:vinyl, and hydroxy:isocyanate. An example of a crosslink that is reversible under cure conditions is hydroxy:aminoplast, and hydroxy: activated methylene.

The coating compositions of the invention are particularly suitable for use in automotive coating compositions, especially primers, basecoats, and/or clearcoats, with clearcoats being especially preferred. The coating compositions of the invention may be powder coatings, waterborne, power slurry, or solventborne.

Coating compositions of the present invention preferably form the outermost layer or layer of coating on a coated substrate. Preferably, the instant coating compositions are applied over one or more layers of primer coatings. For example, the coating compositions of the invention may be used as an automotive topcoat coating applied over a layer of electrocoat primer and/or primer surfacer.

When such coating compositions are used as topcoat coatings, they preferably have a 20 degree gloss, as defined by ASTM D523-89, of at least 80 or a DOI, as defined by ASTM E430-9 1, of at least 80, or both. Such gloss and DOI are particularly useful in providing an automotive finish that will appeal to the buyer of the vehicle. Topcoat coatings may be one coat pigmented coatings or may be a color-plus-clear composite coating.

Coating compositions of the present invention, if used as a one coat pigmented coating or the color coating of a color-plus-clear composite coating, will include one or more pigments well-known in the art, such as inorganic pigments like titanium dioxide, carbon black, and iron oxide pigments, or organic pigments like azo reds, quinacridones, perylenes, copper phthalocyanines, carbazole violet, monoarylide and diarylide yellows, naphthol orange, and the like.

In a preferred embodiment, the coating composition of the present invention is the clearcoat of a color-plus-clear composite coating. The clearcoat may be applied over a color coat according to the invention or may be applied over a color coat of a formulation already known in the art. Pigmented color coat or basecoat compositions for such composite coatings are well known in the art and do not require explanation in detail herein. Polymers known in the art to be useful in basecoat compositions include acrylics, vinyls, polyurethanes, polycarbonates, polyesters, alkyds, and polysiloxanes. Such basecoats may comprise the polymer (a') of the invention. Preferred polymers include acrylics and polyurethanes.

Other materials well-known to the coatings artisan, for example, surfactants, fillers, stabilizers, wetting agents, dispersing agents, adhesion promoters, UV absorbers, light stabilizers such as HALS, antioxidants, solvents, catalysts, and/or rheology control agents, may also be incorporated into the coating compositions of the invention. The amount of these materials used must be controlled to achieve the desired performance properties and/or to avoid adversely affecting the coating characteristics.

Coating compositions can be coated onto an article by any of a number of techniques well known in the art. These include, for example, spray coating, dip coating, roll coating, curtain coating, and the like. For automotive body panels, spray coating is preferred. When the coatings will be relatively thick, they are usually applied in two or more coats separated by a time sufficient to allow some of the water and/or solvent evaporate from the applied coating layer ("flash"). The coats as applied are usually from 1 to 3 mils of the coating composition, and a sufficient number of coats are applied to yield the desired final coating thickness.

Where a color-plus-clear composite coating is applied to the prepared substrate, the color coat is usually applied in one or two coats, then allowed to flash, and the clear coat is then applied to the uncured color coat in one or two coats. The two coating layers are then cured simultaneously. Preferably, the cured base coat layer is 0.5 to 1.5 mils thick and the cured clear coat layer is 1 to 3 mils, more preferably 1.6 to 2.2 mils thick.

Coating compositions of the invention are preferably subjected to conditions so as to cure the coating layers. Although various methods of curing may be used, thermal-curing is preferred. Generally, thermal curing is effected by exposing the coated article to elevated temperatures provided primarily by radiative heat sources. Curing temperatures will vary depending on the particular blocking groups used in the crosslinking agents, however they generally range between 93 degree C. and 177 degree C. In a preferred embodiment, the cure temperature is between 135 degree C. and 165 degree C. In another preferred embodiment, a blocked acid catalyst is included in the composition and the cure temperature is between 115 degree C. and 140 degree C. In a different preferred embodiment, an unblocked acid catalyst is included in the composition and the cure temperature is between 80 degree C. and 100 degree C. The curing time will vary depending on the particular components used and physical parameters, such as the thickness of the layers. Typical curing times range from 15 to 60 minutes, and preferably 15-25 minutes at the target temperature.

EXAMPLES

Example 1

Part 1A

Polymerization using a Reactive Material (c) as a Solvent and Co-Tranesterification of the Reactive Material and the Acrylic Polymer A mixture of 650 parts of saturated a C36 fatty dimer diol and 350 parts of xylene was heated to 140° C. under an inert atmosphere. Then a mixture of 417 parts of hydroxyethyl methacrylate, 253 parts of styrene, 342 parts of 2-ethylhexyl methacrylate and 110 parts of t-butyl peroctoate was added over three and a half hours. The reaction mixture was then reduced to 110° C. and a mixture of 30 parts of toluene and 10 parts of t-butyl peroctoate was added over 30 minutes. The reaction was then held at 110° C. for one hour.

To this reaction mixture was added 814 parts of toluene, 552.8 parts of methyl carbamate, 3.2 parts of dibutyl tin oxide, and 6.9 parts of triisodecyl phosphite. The reaction mixture was brought to reflux under an inert atmosphere. Once at reflux, the inert atmosphere was turned off. Methanol that was formed was removed from the reaction mixture with additional toluene added to keep the reflux temperature below 120° C. After more than 95% of the hydroxy groups on both the acrylic resin and saturated C36 fatty diol were converted to primary carbamate groups, the excess methyl carbamate and toluene transcarbamation solvent was removed by vacuum distillation. Then 715 parts of methyl propyl ketone was added. The final resin had a NV of 73.5%.

Part 1B

A coating composition was prepared by combining the materials in order as set for below in Table 1 and mixing under agitation.

TABLE 1

| Ingredient | |
|---|---|
| Mixture from Part 1A | 95.83 |
| Melamine[1] | 18.04 |
| Rhelogy Control Agent[2] | 20.24 |
| UVA[3] | 3.16 |
| HALS[4] | 1.50 |
| PBA[5] | 0.67 |
| Blocked Acid Catalyst[6] | 4.80 |
| DB Acetate[7] | 2.00 |
| Methyl Propyl Ketone | 10.58 |
| TOTAL | 156.82 |

[1]Resimene 747 Melamine from UCB
[2]Solution of 10% Fumed Silica in Carbamate functional acrylic
[3]Tinuvin 384B from Ciba-Geigy
[4]Tinuvin 123
[5]Lindron 22 from Lindros
[6]Nacure 5225 from King Ind.
[7]From Eastman Example 2

Comparative Example

Part 2A

Preparation of a Carbamate Functional Acrylic Resin 817.4 parts of xylene was heated under an inert atmosphere to reflux. The inert atmosphere was then turned off and a mixture of 659.5 parts of 2-hydroxyethyl methacrylate, 394.7 parts of styrene, 533.5 parts of-ethylhexyl methacrylate and 172 parts of t-butyl-2-ethylhexyl peroxide was added over a three hour period, followed by the addition of 20 parts of xylene. After holding for 30 minutes, the reaction mixture was cooled to 110° C. under an inert atmosphere. Then a mixture of 15.6 parts of t-butyl-2-ethylhexyl peroxide and 46.8 parts of toluene was added over 30 minutes. Then 49 parts of toluene was added. The reaction mixture was then held at 1 10C for an additional hour. The reactor was then set up with a paced column and an extractor to remove methanol, and a mixture of 3.1 parts of dibutyl tin oxide, 487.5 parts of methyl carbamate, 6.9 parts of triisodecyl phosphite and 636.6 parts of toluene was added. The system was allowed to come to reflux. The transcarbamation was taken to its stall point where ~95% of the hydroxy groups were converted into carbamate groups. The solvent and excess methylcarbamate were then removed by vacuum distillation. Then 500 grams of the vacuum stripped resin was dissolved into 214 grams of methyl propyl ketone. The final resin had a NV of 70%.

Part 2B

Preparation of a Carbamate Functional C36 Dimer

To a reactor set up with a packed column and an extractor to remove methanol was added 662.4 parts of methyl carbamate, 2241 parts of Pripol 2030 (Uniqema), 872 parts of toluene, 4.2 parts of dibutyl tin oxide and 20.2 parts of triisodecyl phosphite. The reaction mixture was heated under an inert atmosphere to reflux. The inert atmosphere was then turned off and the reaction allowed to continue at reflux until ~99% of the hydroxy groups were converted to carbamate groups. The solvent and excess methyl carbamate was then removed by vacuum distillation to form a colorless liquid that turned into a wax at room temperature.

Part 2C

A coating composition was prepared by combining the materials in order as set for below in Table 2 and mixing under agitation.

TABLE 2

| Ingredient | |
|---|---|
| Acrylic Resin from Part 2A | 57.60 |
| C36 dicarbamate from Part 2B | 30.73 |
| Melamine[8] | 17.41 |
| Rhelogy Control Agent[9] | 20.24 |
| UVA[10] | 3.16 |
| HALS[11] | 1.50 |
| PBA[12] | 0.67 |
| Blocked Acid Catalyst[13] | 4.80 |
| DB Acetate[14] | 2.00 |
| Methyl Propyl Ketone | 17.11 |
| TOTAL | 155.23 |

[8]Resimene 747 Melamine from UCB
[9]Solution of 10% Fumed Silica in Carbamate functional acrylic
[10]Tinuvin 384B from Ciba-Geigy
[11]Tinuvin 123
[12]Lindron 22 from Lindros
[13]Nacure 5225 from King Ind.
[14]From Eastman Example 3

Evaluation of Paint Samples

The curable coating compositions from Examples 1 and 2 were evaluated per the following. The control was E126CG2023, a 1-component acrylic-blocked isocyanate system available from BASF Corp. of Southfield, Mich. It can be seen that the composition of Example 1 shows improvements in scratch & mar and hardness. It also exhibits a higher cured film $T_g$ and crosslink density with all other properties essentially maintained.

TABLE 3

| Test | Control | Example 1 | Example 2 |
|---|---|---|---|
| Wt Non-volatiles | 51.2 | 65.04 | 65.71 |
| Nanoscratch | | | |
| Fracture Load | 8.42 | 13.03 | 14.18 |
| Plastic Deformation | 0.49 | 0.32 | 0.27 |
| 140 QCT Humidity | | | |
| Initial | 3 | 1.5 | 2 |
| Recovery | 2 | 1.5 | 1 |
| Repair Gravelometer | | | |
| 20 @ 275 | 5 | 6 | 6 |
| 50 @ 305 | 5 | 5 | 6 |
| Tukon Hardness | 9.8 | 10.4 | 9.3 |
| Scratch & Mar | | | |
| Crockmeter | 81.55% | 96.46% | 95.73% |
| DMTA | | | |
| Tg | 84.54 | 134.02 | 117.04 |
| Crosslink Density | 404 | 1185 | 588 |

We claim:

1. A method of making a polymer, comprising
providing a mixture (I) comprising a reactant mixture (a) and a solvent mixture (b) comprising a nonvolatile solvent ($b_{nv}$), wherein reactant mixture (a) comprises one or more polymerizable components and wherein nonvolatile solvent ($b_{nv}$): (i) is not a crystalline solid at 25° C., (ii) is nonvolatile, and (iii) comprises at least one functional group ($F_1$) and (iv) is a fluid solid,
subjecting the reactant mixture (a) to polymerization conditions sufficient to polymerize reactant mixture (a) to provide a polymer (a') comprising a polyurethane polymer, and
subjecting the nonvolatile solvent ($b_{nv}$) to reaction conditions wherein the at least one functional group ($F_1$) of nonvolatile solvent ($b_{nv}$) is reacted with at least one reactant (e) to provide a nonvolatile solvent ($b'_{nv}$) comprising at least two functional groups ($F_2$),
the method producing a mixture (II) comprising the polymer (a') in the nonvolatile solvent ($b'_{nv}$) comprising at least two functional groups ($F_2$), wherein the at least one functional group ($F_1$) is substantially nonreactive: (1) with the components of reactive mixture (a), (2) under the polymerization conditions in which reactant mixture (a) is polymerized, and (3) with polymer (a').

2. A curable coating composition, comprising
a mixture (II) comprising a polymer (a') and a nonvolatile solvent ($b'_{nv}$) comprising at least two functional groups ($F_2$), the mixture (II) made by the process comprising,
providing a mixture (I) comprising a reactant mixture (a) and a nonvolatile solvent ($b_{nv}$), said reactant mixture (a) comprising one or more polymerizable components and said nonvolatile solvent ($b_{nv}$) (i) is not a crystalline solid at 25° C., (ii) is nonvolatile, and (iii) comprises at least one functional groups ($F_1$),
polymerizing the reactant mixture (a) to provide a polymer (a'), and
subjecting said nonvolatile solvent ($b_{nv}$) to reaction conditions wherein the at least two functional groups ($F_1$) of nonvolatile solvent ($b_{nv}$) are reacted with at least one reactant (e) to obtain at least two functional groups ($F_2$),
with the proviso that the functional groups ($F_1$) and ($F_2$) are not the same and the at least two functional groups ($F_1$) are substantially nonreactive: (1) with the components of reactive mixture (a), (2) under the polymerization conditions in which reactant mixture (a) is polymerized, and (3) with polymer (a') and at least one crosslinking agent (f) comprising at least one functional group (fi), which is reactive with functional groups ($F_2$) of nonvolatile solvent ($b_{nv}$).

3. The curable coating composition of claim 2 wherein functional group (fi) reacts with functional group ($F_2$) of nonvolatile solvent ($b_{nv}$) to form a crosslink which is nonreversible when the curable coating composition is subjected to cure conditions.

4. The curable coating composition of claim 2 further comprising a crosslinking agent (f) comprising at least one functional group (fii), which is reactive with polymer (a').

* * * * *